United States Patent [19]

Herzing et al.

[11] Patent Number: 4,464,411

[45] Date of Patent: Aug. 7, 1984

[54] CONFECTIONARY COATING COMPOSITIONS CONTAINING POLYGLYCEROL ESTER EMULSIFIERS

[75] Inventors: Anthony G. Herzing, Middleburg Heights; Nickolas Palamidis, Strongsville, both of Ohio

[73] Assignee: SCM Corporation, New York, N.Y.

[21] Appl. No.: 439,336

[22] Filed: Nov. 5, 1982

[51] Int. Cl.$^3$ ............................................. A23D 5/00
[52] U.S. Cl. ................................... 426/613; 426/654
[58] Field of Search ...................... 426/613, 654, 607

[56] References Cited

U.S. PATENT DOCUMENTS

| | | | |
|---|---|---|---|
| 2,626,216 | 1/1953 | Cross | 426/654 |
| 2,671,027 | 3/1954 | Cross | 426/613 |
| 2,785,978 | 3/1957 | Gracht | 426/613 X |
| 4,093,750 | 6/1978 | Babayan | 426/654 X |

FOREIGN PATENT DOCUMENTS 1025265  4/1966  United Kingdom ............... 426/606

Primary Examiner—Robert A. Yoncoskie
Attorney, Agent, or Firm—Richard H. Thomas

[57] ABSTRACT

A novel polyglycerol ester emulsifier blend beneficial in improving the performance of hard butters, which can be either lauric or non-lauric, and improved confectionary coatings made with such hard butters.

5 Claims, No Drawings

CONFECTIONARY COATING COMPOSITIONS CONTAINING POLYGLYCEROL ESTER EMULSIFIERS

TECHNICAL FIELD

The present invention relates to novel confectionery coating compositions, and particularly to a novel emulsifier blend which was found to be beneficial in improving the performance of hard butters which are both lauric and non-lauric in confectionery coatings.

BACKGROUND ART

Lauric fractionated hard butters have been used for some time in replacing cocoa butter in confectionery coatings. Normally, these hard butters have to be tempered when they are used in such coatings. Tempering is a thermal process that stabilizes the crystal structure of the hard butter in the coatings, thus providing the coatings with better shelf life. It is known to add other lipoidal substances, e.g., lipoidal emulsifiers, to the hard butters to stabilize the crystal structure, alleviating the need for tempering. These emulsifiers, however, also affect the physical properties and organoleptic characteristics of the coating when they are used, and some of the properties are improved while others are degraded.

Usually, two, three, or more of the lipoidal emulsifiers may be used together, in the hope of providing a synergistic effect designed to improve most of the properties of the coatings while not degrading the rest of them.

By way of example, U.S. Pat. No. 2,586,615 teaches the value of sorbitan monostearate and polyoxyethylene sorbitan monostearate (polysorbate 60) as a bloom inhibitor. A similar combination was found to act as an "inhibitor against dulling," as disclosed in U.S. Pat. No. 2,671,027. Prior U.S. Pat. No. 2,999,023 refers to the value of sugar esters for gloss enhancing. In the publication "Food Engineering," of May, 1967, pages 79–82, polyglycerol esters are mentioned as being useful for confectionery coatings and chocolate, to maintain gloss properties. They are also said to minimize tempering and handling problems, and to aid these products to retain moisture, thereby preventing them from drying out during storage. Specific polyglycerol esters mentioned were triglycerol monooleate and decaglycerol trishortening.

British Pat. No. 1,297,579 teaches the use of polyglycerol esters in chocolate compositions to obtain aeration of such compositions. Tri- and tetraglycerol esters were mentioned as being preferred.

It is also known to use non-lauric (so-called domestic) hard butters in confectionery coatings. With these hard butters, it too is necessary to use a blend of emulsifiers to stabilize crystal structure and improve such properties as gloss retention and bloom resistance. One problem experienced, however, is that those emulsifiers useful with lauric hard butters are not necessarily useful with non-lauric hard butters. An advantage of the present invention is that the emulsifier blend thereof is useful for both lauric and non-lauric hard butters.

DISCLOSURE OF INVENTION

The present invention resides in the discovery of a novel combination of polyglycerol ester emulsifiers capable of providing considerable gloss improvements in confectionery coatings, both lauric and non-lauric hard butter coatings, without adversely affecting organoleptic characteristics. Such characteristics are not only not adversely affected but are also improved, even though some only slightly.

Specifically, the present invention resides in a confectionery coating composition comprising effective amounts of confectionery coating composition ingredients, including a lauric or non-lauric hard butter and a blend of polyglycerol esters, said blend consisting essentially of the following polyglycerol ester compounds

| Polyglycerol ester comp. | Approximate parts | Approximate polyol hydroxyl number | Approximate ester hydroxyl number | Average degree of polymerization |
|---|---|---|---|---|
| (a) | 0–35 | 970–1350 | 340–410 | 2–6 |
| (b) | 30–60 | 880–970 | 400–600 | 6–10 |
| (c) | 30–60 | 880–970 | 400–600 | 6–10 | said compounds being prepared by interesterification of polyglycerol with fat or oil or by direct esterification with a fatty acid derived from such fat or oil, the fat, oil, or fatty acid of compounds (a) and (b) being a 0–5 IV stearine or fatty acid; the fat, oil, or fatty acid of compound c) being partially hydrogenated in which 60–95% of the fatty acids are a combination of oleic and elaidic acids.

A particularly useful blend, for use with non-lauric hard butters, comprises substantially equal proportions of triglycerol monostearate, octaglycerol monostearate and octaglycerol monooleate, employed in a gloss-forming amount.

A particularly useful blend, for use with lauric hard butters, comprises substantially equal proportions of octaglycerol monostearate and octaglycerol monooleate, said blend being employed in a gloss forming amount.

In a preferred embodiment, wherein said hard butter is a lauric hard butter, the polyglycerol ester blend is about 6% by weight of the hard butter content.

BEST MODE FOR CARRYING OUT THE INVENTION AND INDUSTRIAL APPLICABILITY

A variety of hard butters may be employed in the compositions of this invention. Although there have been no recognized or accepted specifications on the chemical constitution of hard butters, they are a broad class of triglyceride materials which possess special physical properties and performance qualities. The principal physical properties considered in a hard butter are its softening point, melting point, and fracture quality. Suitable hard butters should have a Wiley Melting Point between 84° F. and 120° F. and should be hard and brittle at around normal room temperatures; that is they should break sharply and suddenly at about 75° F., thereby having a brittle quality sometimes referred to as "snap." They should also be capable of standing at temperatures encountered in normal summer conditions without having liquid glyceride components "sweat" or bleed out to the surface in the form of droplets or a visible liquid film.

Of the numerous performance qualities of a hard butter, an important desirable quality is the freedom from a "waxy" feeling or after-taste in the mouth which is related somewhat but not entirely to a narrow or sharp melting range. Other performance qualities are gauged largely by the performance of standard coatings made with the hard butter. Coatings containing desirable hard butters should set or solidify within a few minutes under normal conditions encountered in the commercial practice of enrobing or otherwise applying the coating to a candy center or food product which is to be coated. The coated product emerging from the cooling tunnel should be firm enough to permit it to be packaged. Another important performance quality is the ability of the coating, and the hard butter therein, on the enrobed product to resist any appreciable change in appearance or character when exposed to normal summer temperature (e.g., up to 90° F.) or at temperatures which are apt to be encountered in the transportation of the coated products.

Lauric hard butters which are suitable are prepared primarily from lauric oils such as palm kernel, coconut, tucum, babassu, etc., utilizing a variety of processes such as pressing, hydrogenation, rearrangement, replacement, interesterification, esterification, blending and solvent fractionation. The resultant hard butters are triglycerides of aliphatic carboxylic acids containing between 8 and 18 carbon atoms and predominantly contain 12 carbon atoms.

Suitable hard butters commonly referred to in the art as "domestic hard butters" are non-random triglyceride hard butters which are obtained by the solvent fractionation of hydrogenated soybean, cottonseed, peanut, rapeseed and corn oils. Domestic hard butters and processes for preparing them are described in U.S. Pat. No. 2,972,541. They can be blended with lauric hard butters and/or plastic fats and can be incorporated with sugar and other ingredients to provide confections having the characteristics most desired for the particular end use intended.

One particular lauric hard butter with which the emulsifier blend of the present invention is useful is Satina AB (trademark SCM Corporation), a solvent fractionated fat derived from palm kernel oil. This hard butter has a Wiley Melting Point in the range of 89°–93° F., as determined by AOCS method Cc 2-38, and an approximate solid fat index, as determined by AOCS method Cd 10-57, of

| Temperature °F. | Approx. Solid Fat Index |
| --- | --- |
| 50 | 72–74 |
| 70 | 65–69 |
| 80 | 52–59 |
| 92 | 2 max. |
| 100 | 0 |

The hard butter is designed for use in pastel or chocolate flavored coatings and requires little or no tempering following application to a center. It provides properties which are similar to chocolate in shrink, set-up, snap and edibility. When used with the emulsifier blend of the present invention, it has excellent gloss, gloss retention and resistance to bloom.

Other lauric hard butters are represented by the Paramount trademark series (trademark SCM Corporation), having Wiley Melting Points in the range of 93°–119° F. and solid fat indices in the following ranges:

| Temperature °F. | Approx. Solid Fat Index |
| --- | --- |
| 50 | 66–68 |
| 70 | 53–58 |
| 80 | 38–52 |
| 92 | 9–30 |
| 100 | 1–19 |
| 110 | 0–12 max. |

The Paramount hard butters are marketed with 0.4% lecithin.

A non-lauric hard butter with which the present invention is useful is Kaomel (trademark SCM Corporation), having a Wiley Melting Point in the range of about 97°–101° F., an IV of about 59, and a solid fat index as follows:

| Temperature °F. | Approx. Solid Fat Index |
| --- | --- |
| 50 | 69 min. |
| 70 | 59 min. |
| 80 | 52 min. |
| 100 | 5 max. |
| 110 | 0 |

This hard butter is derived by hydrogenation and solvent fractionation from soybean and cottonseed oil, and is described in U.S. Pat. No. 2,972,541 by Cochrane et al., assigned to assignee of the present invention.

The amount of hard butter employed is an effective amount necessary for a confectionery coating. Specific proportions are known to those skilled in the art.

The polyglycerol esters of the present invention are broadly a mixture of unsaturated and saturated fatty acid esters of a mixture of polyglycerols in which the range of polyglycerol is from diglycerol to decaglycerol. The unsaturated and saturated fatty acids generally contain 16 to 18 carbon atoms and are typically derived from corn oil, cottonseed oil, lard, palm oil, peanut oil, safflower oil, sesame oil, soybean oil, tallow, and tall oil and the fatty acids derived from these substances are either hydrogenated or unhydrogenated. The polyglycerol mixture is prepared by the polymerization of glycerol with an alkaline catalyst, as exemplified in U.S. Pat. No. 3,637,774, or an acid catalyst as exemplified in U.S. Pat. No. 3,968,169. The esters are then obtained by esterifying the polymerized glycerol with fatty acids either in a direct esterification process or by reaction with fats and oils in an interesterification process. The iodine value of the fatty acid or fat can range from 0 to 90.

The following Table identifies the specific polyglycerol esters employed in the blend of the present invention and amounts used (column 2 of the Table). Column 3 specifies the hydroxyl number range for the starting polyglycerol used in the preparation of the ester, column 4 giving the hydroxyl number range for the ester itself. The average degree of polymerization for the starting polyol is given in column 5, column 7 identifying a representative ester defined by the data of columns 2–6.

The hydroxyl number of Table 1 is an indication of the number of free hydroxyl groups present in either the polyglycerol or the ester, and is the number of milligrams of potassium hydroxide equivalent to the hydroxy content of one gram of sample. The hydroxyl number and average degree of polymerization best characterize the compounds of the present invention.

The degree of polymerization is obtained by correlation with the hydroxy number following standard procedures.

TABLE 1

| Polyglycerol ester comp. | Approximate parts | Approximate polyol hydroxyl number | Approximate ester hydroxyl number | Average degree of polymerization | Fat or Oil | Representative compound |
|---|---|---|---|---|---|---|
| (a) | 0–35 | 970–1350 | 340–410 | 2–6 | 0–5 IV stearine | triglycerol monostearate (3-1-S) |
| (b) | 30–60 | 880–970 | 400–600 | 6–10 | 0–5 IV stearine | octaglycerol monostearate (8-1-S) |
| (c) | 30–60 | 880–970 | 400–600 | 6–10 | partially hydrogenated oil in which 60–95% of the fatty acids are a combination of oleic and elaidic acids | octaglycerol monooleate (8-1-O) |

A typical fat or oil used for the preparation of compound (c), e.g., octaglycerol monooleate, is a partially hydrogenated soybean oil or high oleic safflower oil having an IV of for instance about 85. Partially hydrogenated soybean oil is approximately 60–80% oleic or elaidic acid and 10–15% linoleic acid. High oleic safflower may be approximately 80% oleic/elaidic and and about 10% linoleic. Other suitable source fats or oils are corn, rapeseed, or cottonseed. For direct esterification, it is also possible to use a refined fatty acid derived from the above oils, or tall oil, or an animal fat such as lard or tallow.

For the preparation of compound (a), e.g., triglycerol monostearate, by interesterification, one can use any food grade stearine, but preferred stearines are palm, soybean or cottonseed stearine. For instance, palm stearine, having about 50% stearic acid and 45% palmitic acid, is a good candidate. Cottonseed stearine is about 75% stearic and about 20–25% palmitic. For direct esterification, 0–5 IV stearic acid can be obtained from a number of sources, as well as from palm, soybean or cottonseed stearine. Hydrogenation to 0–5 IV can take place prior to or subsequent to isolating the fatty acid. As with the stearine, the fatty acid normally would not be 100% stearic acid.

A preferred stearine for compound (b), e.g., octaglycerol monostearate, is a cottonseed or soybean stearine having about 75–100% stearic acid (typically 90%).

A specific polyglycerol ester blend of the present invention comprises three polyglycerol esters marketed by SCM Corporation under the trademark Santone. These polyglycerol esters and their typical properties are given in the following Table 2.

TABLE 2

| Santone 3-1-S | triglycerol monostearate | Sap Value: | 115–135 |
| | | Met. Drop. Pt. | 52–55° C. |
| | | IV: | 0.5 |
| | | Acid Value: | 8.0 Max. |
| | | HLB: | 7.2 |
| Santone 8-1-O | octaglycerol monooleate | Sap Value: | 77–88 |
| | | Acid Value: | 5.0 max. |
| | | IV: | 45–55 |
| | | HLB | 13.0 |
| Santone 8-1-S | octaglycerol monostearate | Sap Value: | 77–88 |
| | | Met. Drop. Pt.: | 52–57° C. |
| | | Acid Value: | 5.0 max. |
| | | IV: | 0–5 |
| | | HLB: | 13.0 |

In one example of the present invention, they are used in approximately equal proportions. Approximate ester hydroxyl numbers for the above compounds are 360, 505, and 510, respectively. The average degrees of polymerization are as specified in the compound coke designations (first digit).

The hard butter compositions of the present invention are useful in confectionery compositions, which may be chocolate flavored or pastel. A typical milk chocolate formulation for such hard butter compositions is as follows:

MILK CHOCOLATE FLAVORED COATING SUITABLE FOR ENROBING CONTAINING WHOLE MILK POWDER

| Ingredient | Weight % |
|---|---|
| Sugar | 42.45 |
| Cocoa Powder (11% natural process) | 6.50 |
| Whole milk powder | 7.50 |
| Non-fat dry milk | 12.00 |
| Lauric hard butter | 31.00 |
| Salt | .10 |
| Methyl vanillin | .05 |
| Lecithin | .40 |
| | 100.00 |

A pastel coating composition is as follows:

PASTEL COATING SUITABLE FOR ENROBING, CONTAINING WHOLE MILK POWDER

| Ingredient | Weight % |
|---|---|
| Sugar | 46.40 |
| Whole milk powder | 4.00 |
| Non-fat dry milk | 15.00 |
| Lauric hard butter | 34.00 |
| F D & C lake color | .05 |
| Salt | .10 |
| Methyl vanillin | .05 |
| Lecithin | .40 |
| | 100.00 |

In the practice of the present invention, the polyglycerol ester blend is employed in the weight proportion of about 1–7% (preferably about 4–6%), based on the hard butter weight. The blend may be used alone or with other emulsifiers, such as lecithin, a polysorbate, or sorbitan monostearate. Preferably, the blend is employed by adding it to molten hard butter, although it can be added separately from the hard butter in preparation of the coating composition.

EXAMPLE 1

A plurality of confectionery coatings were prepared with Satina AB*, using various combinations of polyglycerol esters. The basic coating formulation was as follows:

| | |
|---|---|
| Satina AB (plus polyglycerol esters) | 32.60% |
| Cocoa powder | 12.06% |
| Sugar | 54.80% |
| Salt | 0.10% |
| Methyl vanillin | 0.04% |
| Lecithin | 0.40% |

*Satina AB is one of several Satina lauric hard butters. It has a narrow melting range, with 2 max. SFI at 92° F. and about 55 SFI at 80° F. Its WMP is 89°–93° F.

The confectionery coatings were evaluated for their physical properties and organoleptic characteristics according to standard confectionery procedures. The scores of these evaluations are shown on the attached Table 3.

The scores show that the combination of 2% 3-1-S, 2% 8-1-S, and 2% 8-1-O, in the column second from the right, improved over other combinations in terms of hardness, initial gloss and gloss retention, enrobed gloss, and set times as well as melting quality, lack of waxiness, overall texture and lack of soapiness, while not affecting adversely other properties of the coatings.

Very good results with a lauric hard butter were also obtained with the blend in the column furthest to the right, the combination of 2% 8-1-S and 2% 8-1-O. Actually, in terms of initial gloss, gloss retention (gloss days index at ambient) and overall acceptability (from the 9-point hedonic scale), key properties for a confectionery coating, this blend was the most successful of all.

Gloss times days index—to measure gloss retention—obtained by plotting gloss against time (in days) and calculating the area beneath the plotted curve.

Set time, minutes—obtained using a 15 ml polycarbonate centrifuge tube to hold 6 ml of sample, a thermocouple inserted into the sample, and a 50 ml polycarbonate centrifuge outer tube into which the 15 ml sample tube is inserted, the 50 ml outer tube being covered with water at 50° F. to the 30 ml mark. The set time is that time from insertion of the thermocouple into the sample to the apex of the sample crystallization curve. The starting temperature for the sample is 120° F.

Viscosity—obtained using a MacMichael Viscometer and ASCT standard procedure for determining viscosity. The viscosity was taken at 120° F.

Organoleptic characteristics—obtained after 14 months' storage using a taste test panel, and measuring properties according to acceptability. The properties are; snap, flavor release, meltability, lack of waxiness, texture, soapiness, off-flavor, and overall acceptability. The ratings are on a 9-point scale, from unacceptable to excellent, except with regard to off-flavor, which is on a 9-point scale from none to extreme.

TABLE 3

| Polyglycerol Ester | Polyglycerol Ester or Blend in percent of hard butter (Satina AB) | | | | | | | |
|---|---|---|---|---|---|---|---|---|
| 3-1-S | 2 | 2 | | | 1 | 2 | 2 | 0 |
| 8-1-S | | 2 | 2 | | 1 | | 2 | 2 |
| 8-1-O | 2 | | | 2 | 1 | | 2 | 2 |
| Physical properties | | | | | | | | |
| Hardness, | | | | | | | | |
| ambient | 15.3 | 15.5 | 13.7 | 14.2 | 13.4 | 15.9 | 14.86 | 15.83 |
| in 1/10 mm 80° F. | 28.7 | 30.7 | 21.4 | 25.7 | 23.2 | 28.2 | 23.64 | 28.92 |
| Gloss, | | | | | | | | |
| initial | 82.5 | 81.6 | 79.3 | 78.5 | 84.5 | 81.0 | 81.5 | 85.0 |
| enrobed | 3 | 6 | 5 | 2 | 5 | 5 | 5 | 3 |
| amb. storage | 75.3 | 68.4 | 75.3 | 69.6 | 79.5 | 73.3 | 78.0 | 79.52 |
| 80° F. storage | 65.4 | 74.1 | 69.1 | 67.9 | 69.4 | 69.6 | 71.7 | 69.73 |
| cycling | 11.1 | 12.4 | 10.2 | 12.3 | 12.8 | 13.1 | 19.7 | 17.58 |
| Gloss, | | | | | | | | |
| times days | | | | | | | | |
| index, ambient | 9267.5 | 8408.0 | 9262.0 | 8565.5 | 9772.0 | 9008.5 | 9598.5 | 9780.5 |
| 80° F. | 6348.5 | 7192.0 | 6708.0 | 6584.5 | 6726.5 | 6755.0 | 6952.0 | 6763.5 |
| cycling | 522.5 | 585.0 | 478.0 | 576.5 | 601.0 | 616.0 | 927.5 | 826.5 |
| Set time, minutes | 14.9 | 15.4 | 13.8 | 13.9 | 14.7 | 14.6 | 13.9 | 14.56 |
| Viscosity, MacMichael | 67 | 83 | 38 | 45 | 73 | 50 | 50 | 59 |
| Organoleptic characteristics (9-point Hedonic Scale) | | | | | | | | |
| Hardness | 7.0 | 7.1 | 7.5 | 7.4 | 7.8 | 7.4 | 7.1 | 7.4 |
| Flavor release | 7.4 | 7.3 | 7.5 | 7.5 | 6.9 | 7.2 | 6.9 | 7.5 |
| Melting quality | 7.6 | 7.6 | 7.5 | 7.5 | 7.2 | 7.5 | 7.6 | 8.3 |
| Lack of waxiness | 7.0 | 7.5 | 6.7 | 7.2 | 7.0 | 7.2 | 7.4 | 7.7 |
| Overall texture | 7.2 | 8.0 | 7.2 | 7.1 | 7.4 | 7.4 | 7.6 | 8.1 |
| Lack of soapiness | 9.0 | 9.0 | 8.9 | 9.0 | 8.9 | 8.4 | 9.0 | 8.5 |
| Lack of off-flavors | 8.7 | 8.5 | 8.6 | 8.0 | 8.4 | 8.2 | 8.2 | 8.0 |
| Overall acceptability | 7.4 | 7.2 | 6.9 | 6.6 | 7.0 | 7.4 | 6.5 | 7.1 |

TABLE 3

In Table 3, the following procedures were used to obtain the data reported:

Hardness penetration—obtained using a Precision Penetrometer manufactured by the Precision Scientific Co., and a grease cone 25 mm wide × 67 mm long and 350 gm weight. Pressure was applied for 10 seconds.

Gloss—obtained on a Gardner Portable 60° Gloss Meter No. 5833.

EXAMPLE II

This example illustrates the use of the polyglycerol esters in a confectionery coating composition containing a non-lauric hard butter. In this particular example, the coating also contained an amount of cheese powder fill according to the concepts of copending application Ser. No. 402,844, assigned to assignees of the present application. The disclosure of Ser. No. 402,844 is incorporated by reference herein. The cheese powder fill, because it contained a large amount of butterfat, imposed additional burdens on the emulsifier towards achieving the properties expected of a high-quality confectionery coating.

The coating was applied to a farinaceous substrate such as a Nabisco cracker, and was applied to only one side by brushing it in place.

| CHEDDAR CHEESE COATING | |
|---|---|
| Ingredient | Percentage by weight |
| Hard butter (Kaomel) | 36.33 |
| Beatone cheddar cheese powder (Beatrice Foods Co.) | 2.45 |
| Beatreme 1326 aged cheddar cheese powder (Beatrice Foods Co.) | 21.54 |
| Borden's Cheese Zest 3653 cheddar cheese flavor (trademark Borden Co.) | 7.83 |
| Nonfat dry milk | 9.79 |
| Buttermilk solids | 9.79 |
| Lactose | 9.79 |
| Polyglycerol ester 8-1-S flakes* | 1.02 |
| Polyglycerol ester 3-1-S | 0.73 |
| Polyglycerol ester 8-1-O | 0.73 |
| | 100.00% |

*Basically equal parts; 8-1-S flakes has some added stearine

The coating was prepared by first melting the polyglycerol esters into the hard butter at about 150° F. and then refining the coating in a refiner using conventional confectionery techniques and procedures. The coating was then conched at 125° F. for 1-2 hours and enrobing of the substrates took place at about 105° F.

Texture-wise, the coating was slightly chewy, similar to a natural hard cheddar cheese because of the use of the cheese powder, and also was homogeneous and smooth in consistency. It had gloss and gloss retention similar to a conventional confection, exhibited no tendency to bloom, and gave with the substrate an excellent flavor profile. The coating had a moisture content of less than about 3.5%.

We claim:

1. In a confectionery coating composition comprising lauric or non-lauric hard butters, flavors and emulsifiers, the improvement comprising an emulsifier of a blend of polyglycerol esters in amounts effective to form a gloss, said blend consisting essentially of the following polyglycerol esters:

| Polyglycerol esters | Approximate parts | Approximate polyol hydroxyl number | Approximate ester hydroxyl number | Average degree of polymerization |
|---|---|---|---|---|
| (a) | 0–35 | 970–1350 | 340–410 | 2–6 |
| (b) | 30–60 | 880–970 | 400–600 | 6–10 |
| (c) | 30–60 | 880–970 | 400–600 | 6–10 | said compounds being prepared by interesterification of polyglycerol with fat or oil or by direct esterification with a fatty acid; the fat, oil, or fatty acid of compounds (a) and (b) being a 0–5 IV stearine or fatty acid; the fat, oil, or fatty acid of compound (c) being partially hydrogenated, in which 60–95% of the fatty acids are a combination of oleic and elaidic acids.

2. The coating of claim 1 wherein said polyglycerol ester blend is about 1–7% by weight of the hard butter content.

3. The coating of claim 1 wherein said hard butter is a lauric hard butter.

4. The coating of claim 1 wherein said polyglycerol ester blend is approximately equal parts of triglycerol monostearate, octaglycerol monostearate and octaglycerol monooleate.

5. The coating of claim 3 wherein said polyglycerol ester blend is approximately equal parts of octaglycerol monostearate and octaglycerol monooleate.

* * * * *